Nov. 30, 1971  E. J. STANG ET AL  3,623,309
METHOD AND MEANS FOR HARVESTING STRAWBERRIES OR THE LIKE
Filed May 22, 1970
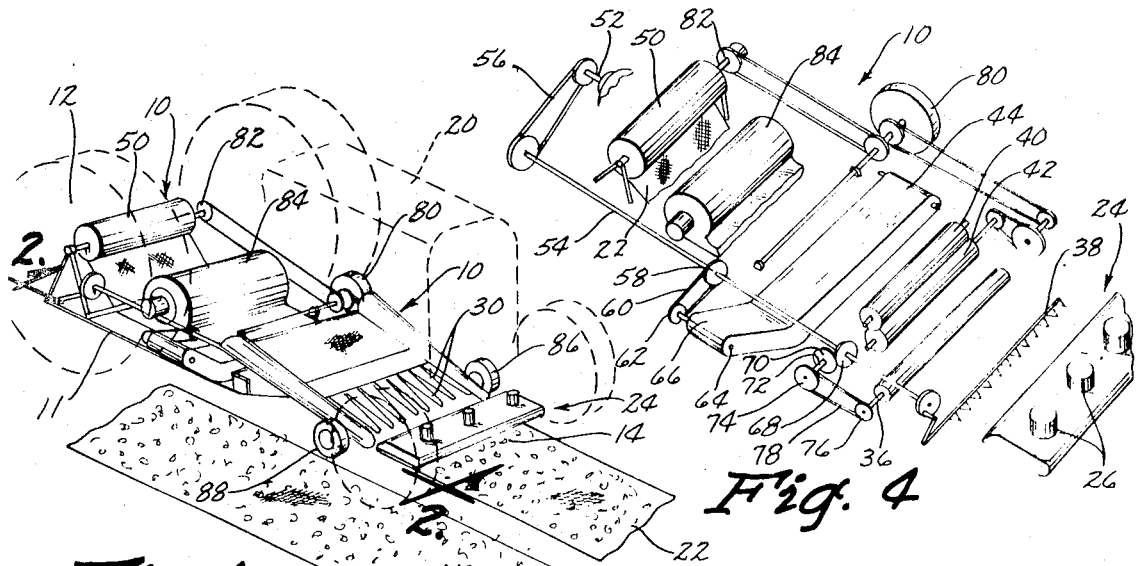
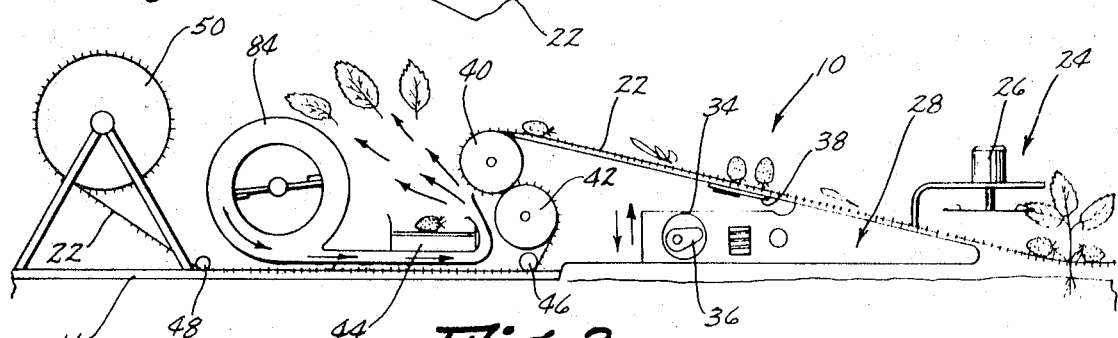
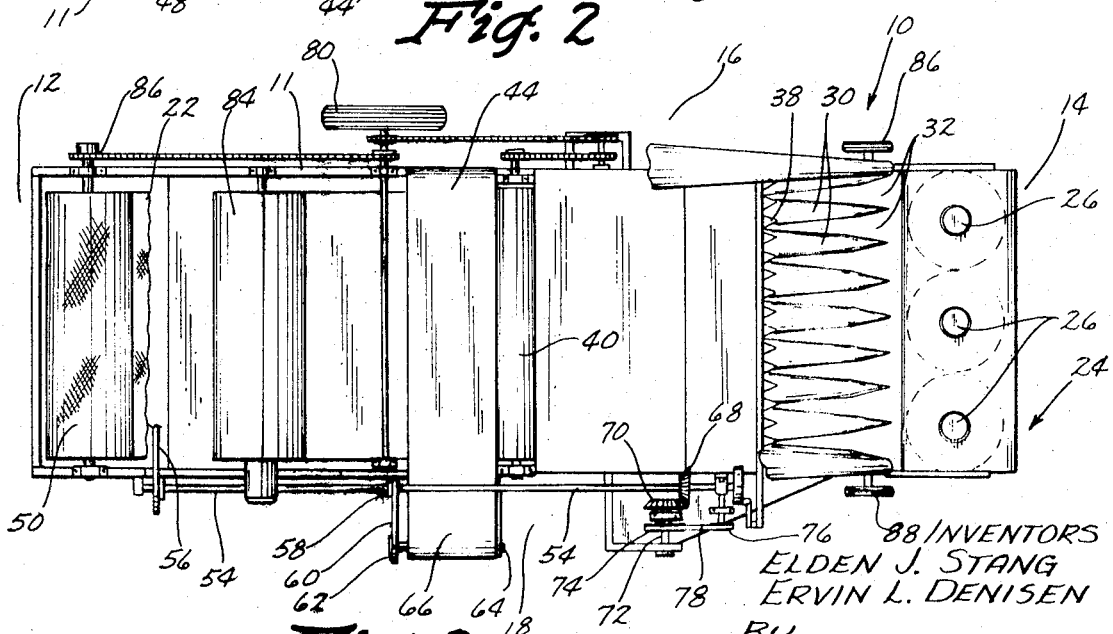
INVENTORS
ELDEN J. STANG
ERVIN L. DENISEN
BY
Zarley, McKee & Thomte
ATTORNEYS United States Patent Office 3,623,309
Patented Nov. 30, 1971

3,623,309
METHOD AND MEANS FOR HARVESTING STRAWBERRIES OR THE LIKE
Elden J. Stang and Ervin L. Denisen, Ames, Iowa, assignors to Iowa State University Research Foundation, Ames, Iowa
Filed May 22, 1970, Ser. No. 39,645
Int. Cl. A01g 19/00
U.S. Cl. 56—330                          14 Claims

ABSTRACT OF THE DISCLOSURE

A machine for harvesting strawberries or the like comprising a tractor mounted frame means having rearward and forward ends. A rotary cutting blade means is mounted on the forward end of the frame means for removing the leaves from the strawberry plants. The frame means includes an inclined platform means extending upwardly and rearwardly from the rotary cutting blade means which is adapted to raise previously positioned flexible netting from the ground and to cause the netting to move over the top of the platform. The platform also includes a plurality of longitudinally extending slots formed therein to permit entrance of the plant pedicels as the plants are moved rearwardly with respect to the platform. A sickle blade is positioned on the frame means below the upper surface of the platform and is adapted to cut the plant pedicels below the netting. The berries are conveyed rearwardly on the netting to a conveyor means with the debris being separated therefrom by a blower means. The frame means also includes a powered net take-up means at the rearward end thereof for winding the netting thereon. A method for harvesting the strawberries or the like is also disclosed wherein flexible netting is placed over the strawberry plants prior to the same emerging from the ground. The netting and the machine disclosed herein permits the strawberries to be harvested for fresh use.

---

One of the most common problems associated with conventional strawberry harvesters is mechanical damage to the berries. Further, the conventional harvesters are primarily designed for use when the strawberries are to be processed rather than for "fresh use."

Therefore, it is the principal object of this invention to provide a method and means for harvesting strawberries or the like.

A further object of this invention is to provide a harvesting machine for strawberries or the like which eliminates mechanical damage to the berries.

A further object of this invention is to provide a harvesting machine for strawberries or the like which permits "fresh use" thereof.

A further object of this invention is to provide a method of harvesting strawberries or the like wherein flexible netting is placed over the strawberry plants prior to their emergence from the ground.

A further object of this invention is to provide a harvesting machine which efficiently harvests the strawberries.

A further object of this invention is to provide a method of harvesting strawberries utilizing flexible netting placed on the plants thereby resulting in substantial secondary benefits.

A further object of this invention is to provide a harvesting machine for strawberries or the like which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a front perspective view of the machine of this invention, a tractor being shown in phantom.

FIG. 2 is a fragmentary side view of the machine of this invention.

FIG. 3 is a top view of the machine of this invention.

FIG. 4 is a perspective view of the power train of the machine of this invention.

The harvesting machine of this invention is designated by the reference numeral 10 and generally includes a frame means 11 having a rearward end 12, forward end 14 and sides 16 and 18. Machine 10 may be self-propelled if desired but is preferably designed so as to be mounted on the tractor 20 which is shown in broken lines in FIG. 1.

The numeral 22 refers to flexible netting such as weather resistant plastic or polyethylene which is placed on the strawberry beds before new growth begins. It is recommended that the netting have a mesh size between ⅜ inch to ¾ inch to be most effective. As the plants grow, the leaves and fruit grow through and develop above the netting.

A rotary cutting blade means 24 is provided at the forward end of the machine 10 and is adapted to remove the leaves from the plants as the machine is moved over plants. Preferably, cutting blade means 24 is comprised of a plurality of blade units 26 driven by electric motors which are electrically connected to the tractor electrical system.

The numeral 28 refers generally to an inclined platform including triangular guides 30 having openings 32 therebetween. The platform 28 includes an opening 34 extending therethrough as illustrated in FIG. 2 which has a camshaft 36 mounted therein. The rotation of camshaft 36 causes the rearward end of the platform 28 to vertically move as depicted by the arrows in FIG. 2 to facilitate raising of the netting from the ground as will be explained hereinafter. A sickle bar 38 is mounted on the platform and is in communication with the upper ends of the openings 32.

Rollers 40 and 42 are rotatably mounted at the rearward end of the platform as illustrated in FIG. 2 at a point forwardly of the conveyor means 44. The numerals 46 and 48 designate idler rollers while the numeral 50 refers to a take-up roller rotatably mounted at the rearward end of the machine. The tractor PTO is referred to generally by the reference numeral 52 and drives a shaft 54 by means of belt 56. Shaft 54 has a pulley 58 thereon which powers conveyor 44 by means of belt 60, pulley 62, and shaft 64. Conveyor 44 includes an inclined portion 66 at its outer end to facilitate the conveyor conveying the fruit to a small bulk container mounted at the side of the machine (not shown).

As seen in FIG. 3, shaft 54 has a bevel gear 68 mounted thereon which is in mesh with a bevel gear 70 mounted on shaft 72. Shaft 72 has a pulley 74 mounted thereon which drives the pulley 76 by means of belt 78. Pulley 76 is connected to the camshaft 36 to impart the vertical oscillation of the platform as previously described. The forward end of shaft 54 is operatively connected to the sickle bar 38 to impart the horizontal oscillating motion required to sever the plant pedicels.

To maintain roller speed (netting pickup) equal to that of ground speed, power to the roller 42 is provided by a ground driven wheel 80 with appropriate sprocket or pulley reduction in the manner illustrated in FIG. 4. The ground wheel 80 also drives the rear take-up roller 50 through a spring-tension slip clutch 82 which permits variable roll-up speed as the roll increases in size, without increasing tension or distorting the netting to the point of effecting action by the rollers 40 and 42. The roller 50 is removable to permit a full roll of netting to be removed and a new roll placed thereon in a minimum amount of time with a minimum amount of effort. The numeral 84 refers to an air blower means which is electrically connected to the tractor electrical system so as to provide a stream of air which passes upwardly and rearwardly between the conveyor 44 and the rollers 42 and 40 in the manner illustrated in FIG. 2 to blow debris from the strawberries.

Support wheels 86 and 88 are rotatably mounted at each side of the machine as illustrated in FIG. 3 to provide support to the forward end of the machine. Preferably, the wheels 86 and 88 are vertically adjustable to permit the forward end of the machine to be properly positioned with respect to the ground surface.

After the strawberries or the like have been planted, the flexible netting 22 is placed on the strawberry beds before new growth begins. As growth begins, the leaves and fruit grow through and develop above the netting. Besides aiding in the harvesting of the berries, some secondary benefits, depending on the properties of the netting such as color, mesh size and strand size, are provided as follows: (1) slightly reduced surface soil temperatures and improved moisture retention; (2) reduction or elimination of the need for heavy mulch to keep the fruit clean; and (3) reduced erosion and splashing of soil onto the fruit by heavy spring rains. After the strawberries have reached a predetermined maturity, the machine 10 is used to harvest the same for fresh use. The netting 22 is extended over the platform 28 and around the rollers 40, 42, 46, 48 and 50 in the manner illustrated in FIG. 2. As the machine is moved over the strawberry beds, the rotary cutting means 24 removes the leaves from the plants. The vertically oscillating platform 28 raises the netting and the fruit from the ground with the plant pedicels being received by the openings 32. The sickle bar 38 severs the plant pedicels below the netting 22 with the strawberries being conveyed rearwardly on the platform by the netting after they have been severed from their pedicels. The berries are carried over the roller 40 and dropped onto the belted conveyor 44 which carries them to a small bulk container at the side of the machine. Debris and shredded leaves which were not blown to the side of the bed by the cutting means 24 are removed from the berries by means of the blower 84 which directs an air stream across the fruit as the fruit is dropping onto the belted conveyor 44. The netting 22, after passing over the machine, is rolled up for storage on the roller 50 until the following fruiting period. To maintain proper roller speed (netting pickup) equal to that of ground speed, power to the drive roller 42 is provided by the ground driven wheel 80 through suitable sprocket reduction. The spring-tension slip clutch 82 connected to the roller 50 permits variable roll-up speed as the roll increases in size without increasing tension or distorting the netting to the point of effecting action by the drive rollers 40 and 42.

The machine described herein not only prevents mechanical damage to the berries but provides an efficient means for harvesting the same to permit the berries to be prepared for "fresh use." The use of the netting not only provides the secondary benefits described above but also provides a unique means for raising the strawberries from the ground as the machine passes thereover to permit the beries to be removed from their supporting plants without damaging the berries. Thus it can be seen that the method and means of this invention accomplish at least all of their stated objectives.

We claim:

1. The method of harvesting strawberries or the like comprising the following steps,
   placing flexible netting over the strawberry beds before the plants have reached a predetermined height,
   after the plants have reached a predetermined maturity, passing a harvesting machine over the plants which removes the leaves from the plants, raising the netting upwardly to a predetermined height, cutting the plants at a position below the raised netting, and conveying the strawberries to a collecting receptacle.

2. The method of claim 1 wherein debris is removed from the strawberries after the plants have been cut.

3. The method of claim 1 wherein said netting is rolled upon a take-up means on the machine after the strawberries have been removed from the netting.

4. The method of claim 1 wherein the strawberries are conveyed rearwardly by the netting which passes over the harvester as the harvester is moved along the field.

5. A harvesting machine for strawberries or the like, comprising, a frame means having forward and rearward ends,
   a first cutting means at the forward end of said frame means adapted to remove leaves from the strawberry plants,
   said frame means including an inclined platform means extending upwardly and rearwardly from said first cutting means adapted to raise previously positioned flexible netting from the ground and to support the same, the netting passing upwardly and rearwardly over the platform means as the machine is moved along the ground,
   a second cutting means positioned on said frame means for cutting the plants below the netting thereby causing the strawberries to be supported on the netting,
   means for conveying the strawberries to a collection receptacle, and power means for powering said first and second cutting means.

6. The machine of claim 5 wherein a cross conveyor is positioned at the rearward end of said platform means adapted to receive the strawberries thereon as the netting moves over the rearward end of the platform means.

7. The machine of claim 5 wherein said platform means includes means for vertically oscillating said platform means as the machine is moved along the ground to facilitate the raising of the netting from the ground.

8. The machine of claim 5 wherein said frame means includes a powered take-up means at the rearward end thereof which rolls the netting thereupon after the strawberries have been removed therefrom.

9. The machine of claim 5 wherein said frame means is tractor mounted and is vertically movable with respect to the tractor and the ground.

10. The machine of claim 5 wherein said first cutting means comprises a horizontally rotatable rotary blade means, said second cutting means comprising a sickle bar means.

11. The machine of claim 5 wherein said frame means includes a drive roller means which pulls the netting rearwardly over said platform means as the machine moves along the ground.

12. The machine of claim 11 wherein a ground engaging drive wheel is operatively connected to said drive roller means for rotating said drive roller means at a speed corresponding to the ground speed of the machine.

13. The machine of claim 6 wherein a blower means is mounted on said frame means adapted to direct an air stream through the strawberries as they pass from the platform means to said cross conveyor to separate debris therefrom.

14. The machine of claim 5 wherein said platform means comprises a plurality of spaced apart guides adapted to receive the plants therebetween, said second cutting means being in communication with the rearward ends of the openings defined between the adjacent guides.

References Cited

UNITED STATES PATENTS

| | | | |
|---|---|---|---|
| 1,962,668 | 6/1934 | Olney | 56—328 R X |
| 3,460,332 | 8/1969 | Buchele et al. | 56—330 |
| 3,511,032 | 5/1970 | Demuth | 56—1 |
| 3,521,438 | 7/1970 | Adrian | 56—330 |
| 3,552,108 | 1/1971 | Kattan et al. | 56—330 |

RUSSELL R. KINSEY, Primary Examiner

U.S. Cl. X.R.

56—1